(12) United States Patent
Shridhar et al.

(10) Patent No.: US 11,556,272 B2
(45) Date of Patent: Jan. 17, 2023

(54) SYSTEM AND METHOD FOR NAND MULTI-PLANE AND MULTI-DIE STATUS SIGNALING

(71) Applicant: Kioxia Corporation, Tokyo (JP)

(72) Inventors: Avadhani Shridhar, San Jose, CA (US); Neil Buxton, Milton (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/025,882

(22) Filed: Sep. 18, 2020

(65) Prior Publication Data

US 2022/0091775 A1 Mar. 24, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0653* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549;
(Continued)

(56) References Cited

U.S. PATENT DOCUMENTS 5,822,251 A * 10/1998 Bruce ................. G06F 12/0246
365/185.33
6,131,139 A * 10/2000 Kikuchi ............... G06F 13/161
711/103
(Continued)

FOREIGN PATENT DOCUMENTS

CN      101965559 B    10/2013
TW      I588651 B      6/2017

OTHER PUBLICATIONS

Definition of "signal"; Merriam-Webster Dictionary; May 8, 2020; retrieved from https://web.archive.org/web/20200508130024/https://www.merriam-webster.com/dictionary/signal on Apr. 1, 2022 (Year: 2020).*

(Continued)

*Primary Examiner* — Daniel C. Chappell

(74) *Attorney, Agent, or Firm* — Foley & Lardner LLP

(57) ABSTRACT

A method for status signaling in a non-volatile memory including a plurality of logical units (LUNs), each of the plurality of LUNs having a status terminal coupled to a common status terminal of the non-volatile memory and a data bus coupled to a common data bus of the non-volatile memory. The method including performing, by a first LUN of the plurality of LUNs, a first set of one or more operations; completing, by the first LUN of the plurality of LUNs, the first set of one or more operations; and sending, by the first LUN via the common terminal, a pulse to a controller responsive to completing the first set of one or more operations.

23 Claims, 8 Drawing Sheets

(58) Field of Classification Search
CPC ...... G06F 2211/00–902; G06F 2212/00–7211; G06F 2213/00–4004; G06F 2216/00–17; G06F 2221/00–2153; G06K 9/00–82; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3297; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | |
|---|---|---|---|
| 7,945,752 B1* | 5/2011 | Miller | G06F 11/1044 |
| | | | 711/162 |
| 8,074,021 B1* | 12/2011 | Miller | G06F 12/0246 |
| | | | 711/114 |
| RE46,201 E | 11/2016 | Selinger et al. | |
| 10,802,756 B1* | 10/2020 | Pream | G06F 3/0659 |
| 2003/0103392 A1* | 6/2003 | Matsushita | G11C 16/06 |
| | | | 365/200 |
| 2003/0198100 A1* | 10/2003 | Matsushita | G11C 8/12 |
| | | | 365/200 |
| 2005/0223158 A1* | 10/2005 | See | G11C 7/1015 |
| | | | 711/103 |
| 2006/0224800 A1* | 10/2006 | Tashiro | G06F 3/08 |
| | | | 710/62 |
| 2007/0143534 A1* | 6/2007 | Hashimoto | G06F 13/1668 |
| | | | 711/103 |
| 2012/0166715 A1* | 6/2012 | Frost | G06F 3/0656 |
| | | | 711/E12.008 |
| 2014/0310574 A1* | 10/2014 | Yu | G11C 29/72 |
| | | | 714/773 |
| 2014/0325131 A1 | 10/2014 | Lassa et al. | |
| 2016/0210070 A1* | 7/2016 | Kurafuji | G06F 3/0622 |
| 2019/0012097 A1* | 1/2019 | Chen | G06F 3/0653 |
| 2019/0354317 A1* | 11/2019 | Fenghai | G06F 3/061 |
| 2020/0301611 A1* | 9/2020 | Sia | G06F 3/0679 |
| 2022/0269513 A1* | 8/2022 | Su | G06F 3/0604 |

OTHER PUBLICATIONS

W. Yan, X. Wang and X. Yu, "Design and implementation of an efficient flash-based SSD architecture," 2014 4th IEEE International Conference on Information Science and Technology, 2014, pp. 79-83, doi: 10.1109/ICIST.2014.6920336. (Year: 2014).*

* cited by examiner

300

performing, by a first LUN of a plurality of logical units (LUNs), a first set of one or more operations, wherein a non-volatile memory includes the plurality of LUNs, each of the plurality of LUNs include a status terminal coupled to a common status terminal of the non-volatile memory and a data bus coupled to a common data bus of the non-volatile memory
302 performing, by a second LUN of the plurality of LUNs, a second set of one or more operations
304 completing, by the first LUN of the plurality of LUNs, the first set of one or more operations
306 sending, by the first LUN via the common terminal, a pulse to a controller responsive to completing the first set of one or more operations
308

performing, by a first LUN of a plurality of logical units (LUNs), a first set of one or more operations, wherein a non-volatile memory includes the plurality of LUNs, each of the plurality of LUNs include a status terminal coupled to a common status terminal of the non-volatile memory and a data bus coupled to a common data bus of the non-volatile memory
402A

completing, by the first LUN of the plurality of LUNs, the first set of one or more operations
406A

sending, autonomously by the first LUN via the common status terminal, a status message indicating a status of the first LUN responsive to completing the first set of one or more operations
408A

FIG. 4A

400B performing, by a first LUN of a plurality of logical units (LUNs), a first set of one or more operations, wherein a non-volatile memory includes the plurality of LUNs, each of the plurality of LUNs include a status terminal coupled to a common status terminal of the non-volatile memory and a data bus coupled to a common data bus of the non-volatile memory
402B performing, by a second LUN of the plurality of LUNs, a second set of one or more operations
404B completing, by the first LUN of the plurality of LUNs, the first set of one or more operations
406B sending, by the controller, a multi-LUN status command to the plurality of LUNs to cause each LUN to send a status message to the controller
408B sending, by the first LUN in response to the multi-LUN status command, via the common status terminal, a status message indicating a status of the first LUN responsive to completing the first set of one or more operations
410B sending by the second LUN in response to the multi-LUN status command via the common status terminal, a status message indicating a status of the second LUN responsive to continuing to process the second set of one or more operations
412B

FIG. 4B

500A monitoring, by a controller, a common status terminal of a non-volatile memory, wherein the non-volatile memory comprises a plurality of logical units (LUNs) each having a status terminal coupled to the common status terminal of the non-volatile memory
502A detecting, by the controller, a pulse on the common status terminal that is indicative of a LUN of the plurality of LUNs completing an operation
504A sending, by the controller, a status command to the plurality of LUNs to cause each LUN to send a status message to the controller
506A

```
sending, by a controller to a first logical unit (LUN)
of a plurality of LUNs, a first set of one or more
operations that cause the first LUN to perform the
first set of one or more operations, wherein a non-
volatile memory includes the plurality of LUNs, each
of the plurality of LUNs include a status terminal
coupled to a common status terminal of the non-
volatile memory and a data bus coupled to a
common data bus of the non-volatile memory
502C
```

```
sending, by a controller to a second LUN of the
plurality of LUNs, a second set of one or more
operations that cause the second LUN to perform
the second set of one or more operations
504C
```

```
receiving, by the controller from the first LUN via the
common terminal, a pulse responsive to the first
LUN completing the first set of one or more
operations
506C
```

FIG. 5C

SYSTEM AND METHOD FOR NAND MULTI-PLANE AND MULTI-DIE STATUS SIGNALING

TECHNICAL FIELD

The disclosure relates generally to NAND memory and, more particularly, to systems and methods for NAND multi-plane and multi-die status signaling.

BACKGROUND

A solid-state drive (SSD) includes several non-volatile memory devices such as but not limited to, NAND flash memory devices controlled by a controller such that the NAND flash memory devices behave like a single drive. The NAND flash memory devices are subject to host originated I/O operations such as reading and writing data stored in the NAND flash memory devices, which may originate from multiple disparate applications running on one or more hosts. A NAND flash memory device may be composed of multiple die but a single die may only be processing a single I/O operation at any one time and a memory bus/channel connecting multiple NAND flash devices to a memory controller may only be transferring data for a single memory device at any one time.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, the present disclosure is directed to a method for NAND multi-plane and multi-die status signaling. The method includes performing, by a first LUN of a plurality of logical units (LUNs), a first set of one or more operations. In some embodiments, a non-volatile memory includes the plurality of LUNs. In some embodiments, each of the plurality of LUNs include a status terminal coupled to a common status terminal of the non-volatile memory and a data bus coupled to a common data bus of the non-volatile memory. The method includes completing, by the first LUN of the plurality of LUNs, the first set of one or more operations. The method includes sending, by the first LUN via the common terminal, a pulse to a controller responsive to completing the first set of one or more operations.

In another aspect, the present disclosure is directed to a method for NAND multi-plane and multi-die status signaling. The method includes performing, by a first LUN of a plurality of logical units (LUNs), a first set of one or more operations. In some embodiments, a non-volatile memory includes the plurality of LUNs. In some embodiments, each of the plurality of LUNs include a status terminal coupled to a common status terminal of the non-volatile memory and a data bus coupled to a common data bus of the non-volatile memory. The method includes performing, by a second LUN of the plurality of LUNs, a second set of one or more operations. The method includes completing, by the first LUN of the plurality of LUNs, the first set of one or more operations. The method includes sending, by the first LUN via the common status terminal, a status message indicating a status of the first LUN responsive to completing the first set of one or more operations.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 is a flow diagram depicting a method for NAND multi-plane and multi-die status signaling, in accordance with some embodiments of the present disclosure.

FIG. 4A is a flow diagram depicting a method for NAND multi-plane and multi-die status signaling, in accordance with some embodiments of the present disclosure.

FIG. 4B is a flow diagram depicting a method for NAND multi-plane and multi-die status signaling, in accordance with some embodiments of the present disclosure.

FIG. 5A is a flow diagram depicting a method for NAND multi-plane and multi-die status signaling, in accordance with some embodiments of the present disclosure.

FIG. 5C is a flow diagram depicting a method for NAND multi-plane and multi-die status signaling, in accordance with some embodiments of the present disclosure.

DETAILED DESCRIPTION OF EXEMPLARY EMBODIMENTS

Figure 1:
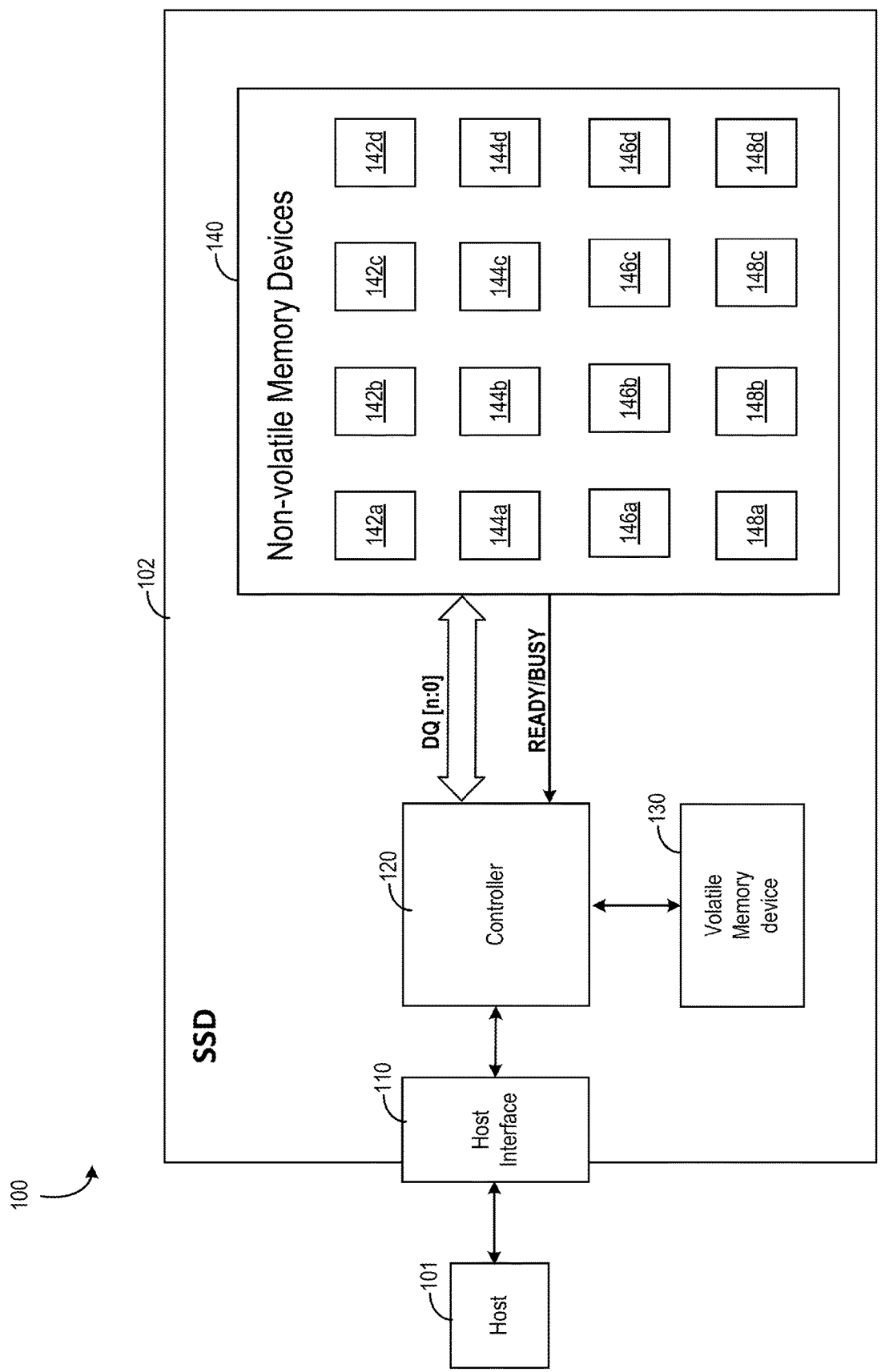
FIG. 1 illustrates an example SSD environment in which techniques disclosed herein may be implemented, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

DRAM Dynamic Random-Access Memory
ESDI Enhanced Small Disk Interface
FeRAM Ferro-Electric RAM
FTL Flash Translation Layer
LBA Logical Block Address
LUN Logical Unit
MRAM Magnetic Random-Access Memory
NAND Not-AND
NVMe Non-Volatile Memory Express
PCI Peripheral Component Interconnection
PCM Phase Change Memory
RAM Random Access Memory
SATA Serial-Advanced Technology Attachment
SCSI Small Component Small Interface
SRAM Static Random-Access Memory
SSD Solid State Drive
USB Universal Serial bus Conventional NAND devices (e.g., each being a semiconductor die) are equipped with a ready/busy (sometimes referred to as, "Ready/!Busy", "RY/BY", or "R/B #) pin used to indicate when the NAND device is processing a PROGRAM or ERASE operation. A controller can determine the ready/busy status of the NAND device by monitoring the ready/busy pin of the NAND device. If the device is ready to accept a new command (e.g., read, write, etc.), then the ready/busy pin will be in a first state (e.g., HIGH). If the device is busy, then the ready/busy pin will be in a second state (e.g., LOW).

In conventional NAND packages, the ready/busy (sometimes referred to as, "Ready/!Busy" or "RY/BY") pin cannot separately indicate the status of each NAND device or plane. For instance, NAND packages may comprise multiple NAND devices which are separate semiconductor dies, each with a ready/busy pin. The ready/busy pins of each NAND die are often connected to a single ready/busy pin on the NAND package and indicates the combined status of the dies. Similarly, for NAND devices incorporating Asynchronous Independent Plane Reads (AIPR), the ready/busy pin of a die indicates the combined status of the AIPR Read on all the planes within the single die. A NAND die is also commonly referred to as a logical unit (LUN), which is the term that will be used hereafter.

Furthermore, the ready/busy pin only indicates that an operation has completed, whether that has been successful or not. In addition, if multiple commands are issued in succession to a NAND package, the ready/busy pin will remain in the busy state until all the operations have completed. The controller still needs to issue (e.g., send, transmit, etc.) a status command to each of the one or more NAND devices performing operations (since it cannot determine which, if any of multiple operations issued in succession has now completed) to get the pass/fail status of an operation (e.g. for PROGRAM or ERASE operations). The controller sends a status command to each NAND device performing operations at an estimated time of completion for each operation being performed and if the operation is not done, periodically sends status commands every polling interval. This, however, introduces delay from when an operation is done to when the status command is sent by the controller. For example, if the polling interval is 5 us, then the status command could be sent up to 5 us after the operation completes.

Thus, a more efficient mechanism is needed for determining the exact moment when a NAND operation completes, in order to get the operation status (e.g., pass/fail) when there are multiple planes capable of independent operation in a LUN and/or multiple LUNs connected to the same ready/busy pin.

Accordingly, the systems and methods discussed herein enhance the circuitry within a NAND device to reduce the overhead of status polling from a controller on the NAND bus, and to reduce the latency of the status message received by the controller.

In a "first" instance, as discussed in greater detail below, the completion of an operation can be indicated by a pulse on the ready/busy pin. A controller can monitor the ready/busy pin and, responsive to detecting the pulse, can send (e.g., as a broadcast signal/command) a multi-LUN multi-plane status command to all the LUNs (e.g., dies) that are connected to the ready/busy pin to efficiently retrieve the status of all the planes and LUNs over a multi-bit data bus (e.g., DQ pins). As such, the controller knows from the pulse on the ready/busy pin when at least one LUN has completed its operation, thereby allowing the controller to obtain—with minimal to no delay—the status of the multiple LUNs and multiple planes within each LUN by using a single status command.

In a "second instance", also discussed in greater detail below, a status message is sent autonomously by the NAND device without any explicit status command from the controller, serially (e.g., bit by bit) on the ready/busy pin itself, while the multi-bit data bus (e.g., DQ pins) is in use for transferring data and/or a command. As a result, the controller can receive the status from each of the one or more NAND devices without having to wait for any on-going data transfer to complete, which further reduces the delay-to-receive status.

The embodiments disclosed herein solve the aforementioned problems and other problems.

1. Solid State Drive Technology and Environment

To assist in illustrating certain aspects of the present disclosure, FIG. 1 illustrates an example SSD environment in which techniques disclosed herein may be implemented, in accordance with some embodiments of the present disclosure. As shown in FIG. 1, the environment 100 includes a host 101 and an SSD 102. The SSD 102 includes a host interface 110, a controller 120, a volatile memory device 130, and a non-volatile memory 140. The non-volatile memory 140 (sometimes referred to as, "a NAND device") includes an array of non-volatile memory dies 142a-142d, 144a-144d, 146a-146d, and 148a-148d (sometimes collectively referred to as, "LUNs" or "NAND devices").

The controller 120 (e.g., an SSD memory controller) is in communication with and operatively coupled to the host 101 through the host interface 110. The host 101 can be one or more host devices and/or host applications. The host 101 can include any suitable device such as but not limited to, a computing device and/or a storage appliance. In some examples, the host 101 can be a user device operated by a user. In some implementations, the host 101 and/or the SSD 102 reside in a datacenter (not shown). The datacenter includes a plurality of platforms, each of which can support a plurality of hosts (such as but not limited to, the host 101) and/or SSD devices (such as but not limited to, the SSD 102).

The host device accesses the SSD 102, for example, by sending write and read commands to the SSD 102. Examples of the host interface 110 include but are not limited to, a Universal Serial Bus (USB) interface, a Serial-Advanced Technology Attachment (SATA) interface, an Enhanced Small Disk Interface (ESDI), a Small Component Small Interface (SCSI), a Peripheral Component Interconnection (PCI) interface, an express Serial Attached SCSI (SAS), an Integrated Drive Electronics (IDE) interface, and/or a Non-Volatile Memory Express (NVMe) interface. In some embodiments the host interface 110 may be a network interface and the host 101 connected to the host interface via a networking fabric (not shown for clarity) which may comprise multiple network routers, network switches and suchlike. Examples of a host interface 110 which is a network interface include, but is not limited to, Ethernet and Fiber Channel (FC).

The SSD 102 includes a volatile memory device 130 and a non-volatile memory 140. The volatile memory device 130 and the non-volatile memory 140 are in communication with the controller 120. As shown in FIG. 1, the controller 120 is in communication with the non-volatile memory 140 via a bidirectional multi-bit data bus (shown in FIG. 1 as, "DQ [n:0]") that is configured to carry data, address information, and/or command information. In some embodiments, 'n' may be any integer including, for example, 2, 4, 8, 16, 32, 64, or 128.

The controller 120 is also in communication with the non-volatile memory 140 via a ready/busy (sometimes referred to as, "Ready/!Busy" or "RY/BY") pin that the non-volatile memory 140 uses to send a ready/busy signal (e.g., a voltage level, a voltage level corresponding to a HIGH or LOW level, a pulse, etc.) indicating when one or more of the non-volatile memory dies 142a-142d, 144a-144d, 146a-146d, or 148a-148d is executing an operation (e.g., busy, occupied, active, unavailable, etc.) or ready for the next operation (e.g., idle, unoccupied, inactive, available, etc.).

Figure 2:
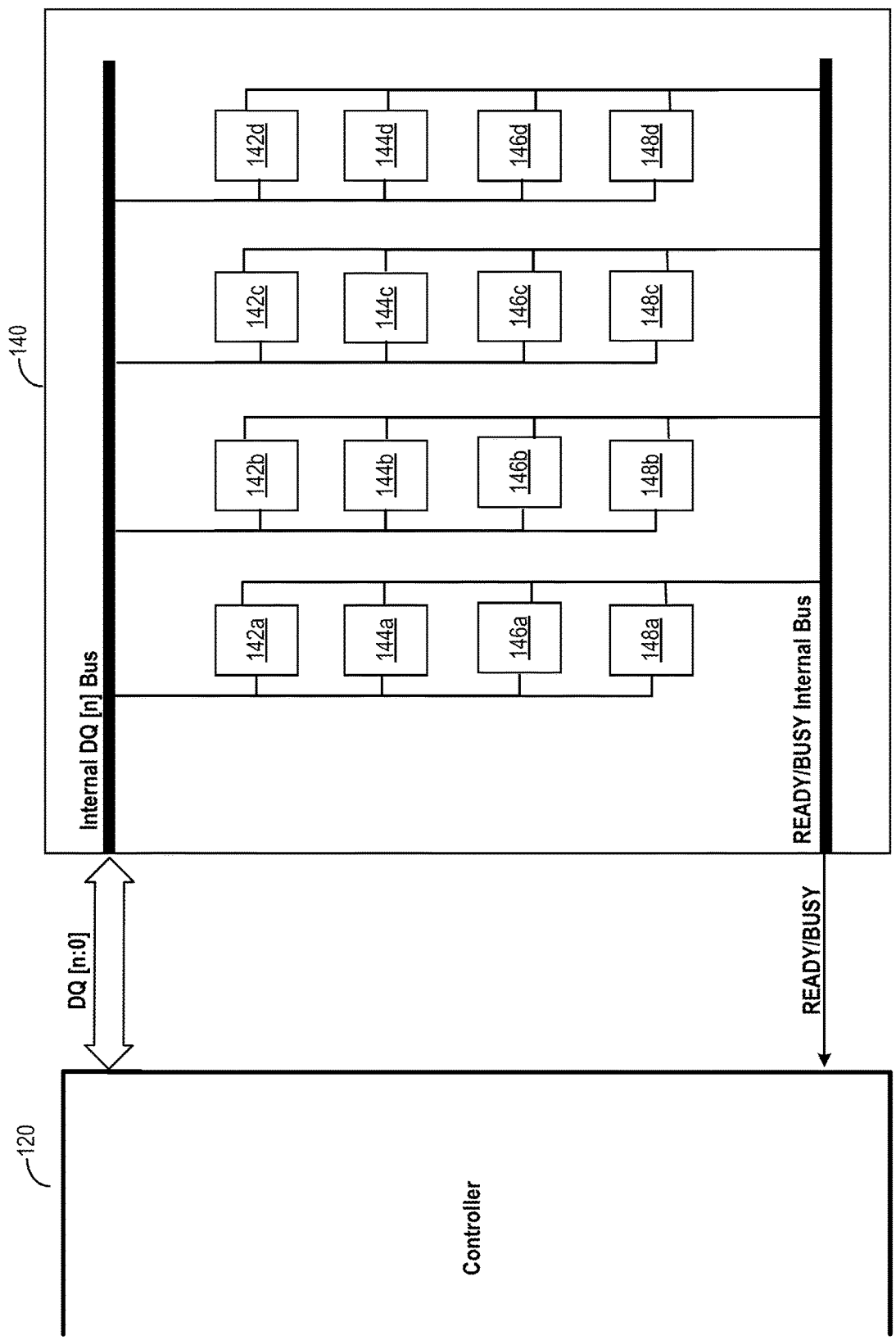
FIG. 2 illustrates an example block diagram of an SSD architecture, in accordance with some embodiments of the present disclosure.

The non-volatile memory 140 generates the ready/busy signal according to the ready/busy status of one or more of the non-volatile memory dies 142a-142d, 144a-144d, 146a-146d, and 148a-148d. For example, FIG. 2 illustrates an example block diagram of an architecture of the non-volatile memory 140 in FIG. 1, in accordance with some embodiments of the present disclosure. As discussed herein, the non-volatile memory 140 includes the non-volatile memory dies 142a-142d, 144a-144d, 146a-146d, or 148a-148d. The ready/busy output of each non-volatile memory dies 142a-142d, 144a-144d, 146a-146d, or 148a-148d is coupled and/or connected to a ready/busy contact (e.g., ball, pin, lead, pad, etc.) of the non-volatile memory 140 via an internal bus. As such, the non-volatile memory 140 generates (e.g., produces) a ready/busy signal to send to the controller 120 via the ready/busy output of the non-volatile memory 140 by combining (e.g., aggregating, summing, etc.) the ready/busy signal from each of the non-volatile memory dies 142a-142d, 144a-144d, 146a-146d, or 148a-148d.

The bidirectional multi-bit data bus of the non-volatile memory 140 is connected and/or coupled to the bidirectional multi-bit data buses of each of the non-volatile memory dies 142a-142d, 144a-144d, 146a-146d, and 148a-148d via an internal bus.

Referring back to FIG. 1, the input/outputs (I/O) of the non-volatile memory 140 (e.g., the ready/busy pin, each bit of the bidirectional multi-bit data bus, etc.) may each correspond to any type of I/O contact of a semiconductor package. For example, an I/O contact may be a ball on a ball grid array (BGA) package, a pin on a pin grid array (PGA) package, or a lead on a chip carrier package.

Although not shown in FIG. 1, the controller 120 may be in communication with the non-volatile memory 140 via any number of buses and/or inputs, including, for example, a Chip Enable (CE or CE #) input configured to select the device for data transfer with the host 101; an Address Latch Enable (ALE) input configured to indicate the type of bus cycle (e.g., command, address, and/or data), a Read Enable (RE or RE #) input configured to facilitate a read data transfer; Write Enable (WE or WE #) input configured to facilitate a write data transfer; and/or a Write Protect (WP or WP #) input configured to disable Flash array program and/or erase operations.

In some implementations, the non-volatile memory 140 can be an array of non-volatile memory devices as shown. The non-volatile memory 140 includes non-volatile memory dies 142a-142d, 144a-144d, 146a-146d, and 148a-148d, which can be arranged in one or more memory communication channels connected to the controller 120. For example, dies 142a-d may be configured on one memory channel, dies 144a-d on another, and so on. While the 16 non-volatile memory dies 142a-142d, 144a-144d, 146a-146d, and 148a-148d are shown in FIG. 1, the non-volatile memory 140 of the SSD 102 can include any suitable number of non-volatile memory devices that are arranged in one or more channels in communication with the controller 120.

In some embodiments, the non-volatile memory dies 142a-142d, 144a-144d, 146a-146d, and 148a-148d includes NAND flash memory. The NAND flash memory includes flash memory. For example, each NAND flash memory device includes one or more individual NAND flash devices, which are non-volatile memory devices capable of retaining data without power. Each of the non-volatile memory dies 142a-142d, 144a-144d, 146a-146d, and 148a-148d has one or more planes. Each plane has multiple blocks, and each block has multiple pages. Data may be written to the pages in a block in consecutive order, once all the pages are written no more data is written until the block is erased, whereupon the pages can be written with new data in consecutive order again, and so on.

While the NAND flash memory devices are described as examples of the non-volatile memory 140, other examples of non-volatile memory technologies for implementing the non-volatile memory storage 120 include but are not limited to, Magnetic Random Access Memory (MRAM), Phase Change Memory (PCM), Ferro-Electric RAM (FeRAM), or the like.

In some embodiments, the volatile memory device 130 includes a volatile memory RAM buffer. In some embodiments the volatile memory device 130 may be wholly, or in part, contained within the controller. The volatile memory device 130 can be a single device of a unitary type or multiple devices of different types capable of providing a volatile memory buffer for the SSD 102. Example of the volatile memory technologies for implementing the volatile memory storage 130 include, but are not limited to, static random access memory (SRAM) and dynamic random access memory (DRAM), or the like.

The controller 120 can combine raw data storage in the non-volatile memory dies 142a-142d, 144a-144d, 146a-

146d, and 148a-148d such that those non-volatile memory dies 142a-142d, 144a-144d, 146a-146d, and 148a-148d function like a single storage. The controller 120 can include microcontrollers, buffers, error correction functionality, flash translation layer (FTL), flash interface layer (FTL), flash controllers, flash management layer software, address mapping table, and firmware for implementing such functions as further described herein. In some arrangements, the software/firmware can be stored in the non-volatile memory 140 or in any other suitable computer readable storage medium.

The controller 120 includes suitable processing and memory capabilities for executing functions described herein, among other functions. For example, the controller 120 includes one or more processors (e.g., central processing units (CPUs)) for implementing the various functions of the SSD 102. As described, the controller 120 manages various features for the non-volatile memory dies 142a-142d, 144a-144d, 146a-146d, and 148a-148d including but are not limited to, Input/output (I/O) handling, reading, writing, erasing, monitoring, logging, error handling, garbage collection, wear leveling, logical to physical (L2P) address mapping, and the like. Thus, the controller 120 provides visibility to the non-volatile memory 140 and FTLs associated thereof.

The controller 120 (e.g., an FTL interface module) can perform logic-to-physical (L2P) operations based on an L2P table. For example, the controller 120 can translate a Logical Block Address (LBA) (e.g., an address provided by the host using a block storage protocol such as NVM Express (NVMe) or serial ATA (SATA) into a physical address (e.g., the reference to a location within a non-volatile memory die), thus resolving the physical address corresponding to the LBA. Responsive to receiving a write or read command (containing a LBA therein) from the host device, the controller 120 (e.g., the FTL interface module) can look up the physical address corresponding to the LBA in order to write to or read from the physical address.

2. Pulsing the Ready/Busy Pin

A new status signaling mode is introduced where a NAND device (e.g., non-volatile memory 140 in FIG. 1) sends one or more pulses on the ready/busy pin when a LUN (e.g., non-volatile memory dies 142a-142d, 144a-144d, 146a-146d, and 148a-148d in FIG. 1) completes its operation on any (e.g., one, more than one, or all) of its planes. The new status signaling mode allows a controller (e.g., controller 120 in FIG. 1) to detect when at least one plane has completed its operation, thereby allowing the controller 120 to issue a status command to NAND without delay. A pulse ensures that if multiple commands are sent in succession to a NAND package, or multiple planes in a NAND die, as each command completes it can be detected, whereas conventionally, a ready/busy pin would stay in the busy state until all commands have completed. The pulse is a momentary transition from a first logic state to a second, then almost immediately back again to the first state. The width of the pulse (the period while in the second logic state), in some embodiments, is determined to be no longer than is found necessary to allow the controller time to detect the pulse, while remaining short enough to minimize the possibility that two commands completing around the same time cause the two completion pulses to merge into one.

For instance, the controller 120 may be configured to generate and send (e.g., provide, transmit, deliver) a command via its multi-dimensional data bus (e.g., DQ [n:0] in FIG. 1) to the non-volatile memory 140. In response to receiving the command, the non-volatile memory 140 enters (e.g., transitions, changes, configures, initializes, etc.) into the new status signaling mode. In some embodiments, the non-volatile memory 140 enters the new status signaling mode by sending a message (e.g., via an internal bus) to one or more of its LUNs, causing the one or more LUNs to be configured according to the new status signaling mode.

Upon entering the new status signaling mode, the non-volatile memory 140 may generate (e.g., produce) a pulse on the ready/busy pin to indicate that at least one plane and/or LUN has completed an operation. The ready/busy pin is common to the one or more LUNs and any of the LUNs may independently drive the ready/busy pin to a logic state such that the state of the ready/busy pin is a logical combination of the individual states driven by the LUNs. (For example, the non-volatile memory 140 may keep (e.g., maintain, hold, preserve, etc.) the ready/busy pin at a first voltage and/or logic state (e.g., HIGH or LOW) when idle and/or during a NAND operation. When the NAND operation completes, the non-volatile memory 140 may transition the ready/busy pin to a second, alternate voltage and/or logic state (e.g., HIGH or LOW) for a predetermined amount of time, and then transition the ready/busy pin back to the first voltage and/or logic state. In doing so, the non-volatile memory 140 generates and/or sends a pulse of a duration (sometimes referred to as, "tReady") to the controller 120. In some embodiments, a pulse may correspond to a rapid, transient change in the amplitude of a signal from a baseline value to a higher or lower value, followed by a rapid return to the baseline value.

The controller 120 may be configured to monitor (e.g., detect, observe) the state and/or status of the ready/busy pin. As such, the controller 120 may receive and/or detect a pulse on the ready/busy pin.

In response to receiving and/or detecting the pulse, the controller 120 may determine (based on the pulse) that one or more LUNs have completed one or more operations. In response to receiving and/or detecting the pulse, the non-volatile memory 140 may retrieve (e.g., acquire) the status (e.g., pass/fail) of the completed operations by sending one or more status commands to the NAND and/or one or more selected LUNs. The one or more status commands are interpreted by each of the one or more selected LUNs which report their status. In some embodiments, the non-volatile memory 140 only sends a status command to the LUN corresponding to the detected pulse.

In some embodiments, as discussed in greater detail below, the non-volatile memory 140 determines the subset of LUNs that could have sent the pulse (i.e., could have completed an operation) on the ready/busy pin and sends one or more status commands to only those LUNs.

In some embodiments, the controller 120 may detect only one pulse in the instance where there are multiple completions. For example, if multiple planes and/or multiple LUNs complete their operation at the same time, then their respective pulses may overlap (e.g., be coincident) in time to cause the controller 120 to only detect one pulse. In this instance, the controller 120 may identify the plane and/or LUN that completed the operation by checking the status of all, or a subset of all, outstanding operations on the ready/busy pin.

The controller 120, in some embodiments, may send a command via its multi-dimensional data bus to the non-volatile memory 140 to cause the non-volatile memory device 140 to exit the new status signaling mode and/or to enter a default mode of ready/busy pin operation. In some embodiments, a default mode of ready/busy pin operation causes the non-volatile memory 140 to generate a signal on the ready/busy pin of the NAND package that is indicative of the combined status (e.g., ready or busy) of the NAND devices and/or LUNs of the NAND package.

2.1 Acquiring LUN Status Via a Multi-LUN Status Command

The controller 120 may be configured to send a multi-LUN status command to a LUN, where the multi-LUN status command is a one-byte command without any LUN or row address. In some embodiments, the controller 120 may be configured to send a multi-LUN status command to the non-volatile memory device 140, where the LUNs of the memory device (e.g., non-volatile memory dies 142a-142d, 144a-144d, 146a-146d, and 148a-148d) individually directly interpret and respond to the multi-LUN status command.

In response to receiving the multi-LUN status command with a Chip Enable (CE), each LUN on the CE can send its status one after another, in the order of their LUN number.

In some embodiments, a LUN may use a 2 bits status per plane as follows:
00=No operation,
01=Successful completion of operation,
10=Errored completion of operation,
11=Busy operation.

In some embodiments, a LUN may use other encodings of the status with different number of status bits. With the example of using a 2 bits status per plane, and 4 planes, 8 bits status per LUN would be desired. With 4 LUNs on a ready/busy pin, there would be 4 status bytes, with the first status byte being sent by LUN0, the second status byte being sent by LUN1, the third status byte being sent by LUN1, and the fourth status byte being sent by LUN1.

The duration of the status byte can allow for a gap (e.g., where no LUN is transmitting) between each data byte sent to avoid overlap in driving the status from one LUN to the next. Initially, the controller 120 may configure, in each LUN, the duration of the status byte and/or the time offset from the status command when that LUN should send its status byte. The controller 120 may be configured to keep track (e.g., store in memory) of operations it requested on each plane of each LUN, and so when it receives the status bits from a LUN, it knows which pending operations the status is for.

2.2 Benefits of the Multi-LUN Status Command

The multi-LUN status command has benefits over the conventional methods. In the existing ready/busy mode of operation available in the conventional NAND devices, the controller 120 can know from the ready/busy pin that at least one of the LUNs (e.g., non-volatile memory dies 142a-142d, 144a-144d, 146a-146d, and 148a-148d) is busy, but it cannot know if one of the other LUNs has completed its operations. By using the multi-LUN status command, however, the controller 120 may detect when at least one LUN has completed its operation and the controller 120 can then issue a status command to the LUN with minimal or no delay.

For instance, in the conventional NAND device, the command sequence to retrieve the status of one plane in one LUN is as follows:
(1) Command_78h, 3-byte-row-address, tWHR, 1-byte-status
; where Command_78h is a command byte with hexadecimal number 78 which tells the NAND to send the status of the plane corresponding to the given row address.
; where tWHR is the amount of time to wait after sending the row address, before reading the status.

Command sequence (1) has a total of 5 bytes transferred on the NAND bus.

Conversely, the sequence of the Multi-LUN status may, in some embodiments, be as follows:
(2) Multi-LUN Status Command Byte, tWHR, All LUNs 4-Byte Status
; where all LUNs 4-byte status may consist of LUN0 1-byte status, LUN1 1-byte status, LUN2 1-byte status, and/or LUN3 1-byte status.

The multi-LUN status sequence may also be 5 bytes on the bus. So, in the same or close to the same bus transfer time taken for the status of 1 plane in the conventional NAND device, with this new multi-LUN status command, the controller 120 can detect the status of all the planes on all the LUNs, and/or retrieve the status of one or more of the completed operations. Since the controller 120 starts read operations in multiple planes and LUNs, after performing the data-out from one or more NAND devices, the status is likely to have more than one operation completion indicated, which reduces the number of status commands to less than 1 per operation.

2.3 Acquiring LUN Status Via a Multi-CE Multi-LUN Status Command

The multi-LUN status command can be extended to support retrieving the status of LUNs of multiple Chip Enables (CEs). For this reason, the controller 120 can configure (e.g., adjust) the delays for the multi-LUN status command when a LUN (e.g., non-volatile memory dies 142a-142d, 144a-144d, 146a-146d, and 148a-148d) sends its status, to have LUNs for CE0 send status according to the embodiments discussed herein, and then for the LUNs in CE1 to start with a gap after the last LUN of CE0, and/or for LUNs in CE2 to start with a gap after the last LUN of CE1, and so on. With such a configuration, the controller 120 can then issue the multi-LUN status command to LUNs of multiple CE at same time. For example, if the controller 120 wants to get (e.g., acquire, retrieve) the status of all LUNs in CE0 and CE1, it can enable CE0 and CE1 when issuing the multi-LUN status command and get status of all LUNs of CE0 followed by status of all LUNs of CE1. In this example, the proposed multi-LUN status command sequence could, in some embodiments, be sent with CE0 and CE1 enabled as follows:
(3) Multi-LUN Status Command Byte, tWHR, CE0 all LUNs 4-byte status, CE1 all LUNs 4-Byte Status

2.4 Requested LUNs Status Command

The multi-CE multi-LUN status command, in some embodiments, may have one or more bytes in the command sequence specifying which LUNs in which CEs are to report status. As such, each device may be configured to use a unique reporting LUN number across all CEs.

In some embodiments, only the requested LUNs will report. In some embodiments, the requested LUNs will report in sequence one after another, starting from lowest reporting LUN to the highest reporting LUN. In some embodiments, the requested LUNs will report in sequence one after another, starting from highest reporting LUN to the lowest reporting LUN. For example, the reporting LUN number may be a combination of CE number and LUN number (in any order) within the CE. Each device, as in conventional NAND, may already know its LUN number within a CE. The controller 120 may initially configure (e.g., initialize, send, etc.) to the devices connected to a CE, the reporting LUN number of LUN0 in that CE. Then one or more of the devices in the CE can calculate (e.g., determine, assess) its unique reporting LUN number by adding its LUN number to the reporting LUN number of LUN0.

The multi-LUN status command, in some embodiments, can specify the LUNs whose status is to be reported by sending a report request bit map in the command sequence, where bit number 'k' represents a LUN whose reporting LUN number is 'k'. For example, with 4 LUNs per CE and two CE, the report bit map could have bits 0 to 3 indicate CE 0's LUNs 0 to 3, and bits 4 to 7 indicate CE 1's LUNs 0 to 3. In this example, to get status of LUN 1 of CE-0 and LUNs 1 and 2 of CE-1, the report bit map may be 62h (hexadecimal number 62).

In some embodiments, the proposed multi-LUN status command sequence may be as follows:
(4) Multi-LUN Status Command Byte, 62h, tWHR, CE-0 LUN1 Status, CE-1 LUN1 Status, CE-1 LUN2 Status

2.5 LUN Status Sent Using Only One DQ Bit by a LUN

A NAND may have at a least 8 DQ pins (e.g., DQ[n:0] in FIG. 2) that is configured to transfer a 1-byte status at a time. In the embodiments described herein, each LUN may send its status, one LUN at a time, using all the DQ pins and they are sent one LUN after another.

In this alternate embodiment, using the 8 DQ pins, the status could be sent by up to 8 LUNs in parallel, with each LUN driving its own dedicated DQ pin.

In some embodiments, if there are more than 8 LUNs, after the first 8 LUNs finish sending their status, the next set of 8 LUNs may send their status. As such, the status may be sent in groups of 8 LUNs.

2.6 Additional Embodiment(s)

The controller 120 can set up initially through set feature type of commands, the following parameters in each LUN:
tStatusByte period: consists of how long the LUN's status should be sent
tStartOffsetTime: how long after the tWHR wait period, this LUN should start its tStatusByte period. This value for the first LUN may be zero.

Then in the command sequence, after the tWHR, each LUN may wait for its tStartOffsetTime and/or send its status for duration tStatusByte.

The controller 120, in some embodiments, may configure the tStartOffsetTime with a different value for each LUN so that LUNs don't overlap in their sending of the status. For example, this tStartOffsetTime could be set for 4 LUN case as:
LUN 0: tGap0
LUN 1: tGap0+tStatusByte+tGap1
LUN 2: tGap0+tStatusByte+tGap1+tStatusByte+tGap2
LUN 3: tGap0+tStatusByte+tGap 1+tStatusByte+tGap2+ tStatusByte+tGap3
; where tGap0 is the gap between the end of tWHR and the first data,
; where tGapk for k=1, 2, 3 is the gap needed between LUN k−1 and LUN k.

The tGapk may be determined based on the delays in the board from each LUN to the controller 120.

3. Autonomously Sending a LUN Status

The non-volatile memory 140, in some embodiments, may be configured to autonomously send the status on the ready/busy pin without receiving a status command from the controller 120. In some embodiments, the non-volatile memory 140 may send the status bit-by-bit serially.

The controller 120, in some embodiments, may be configured to keep track (e.g., store, record) of operations it requested on each plane of each LUN, and so when it receives the status bits from a LUN, it knows which pending operations the status is for.

This method (embodiment) of the non-volatile memory 140 independently sending status on the ready/busy pin without receiving a status command from the controller 120 can reduce the latency of receiving and processing the status. For example, consider that a data-out transfer is being performed for LUN0 and during that time, LUN1 read sense completes and LUN1 independently sends its ready status to the controller 120. The controller 120, with a separate hardware for processing status in parallel to the data transfer, can process status and create the command sequence for the data-out transfer for LUN1. Then, as soon as the LUN0 data transfer completes, the LUN1 data transfer commands can be sent. In the conventional NAND, after LUN0 data transfer completes, the controller 120 sends status command and receives status, then processes status and creates command sequence for the data-out transfer for LUN1. So, there is a delay between the end of LUN0 data transfer and commands to start of LUN1 data transfer in the conventional NAND, and this delay can be avoided with this independent (autonomously sending) status report method.

When there is only one LUN on the ready/busy pin, this method may allow the LUN (via the non-volatile memory 140) to start sending the status bits as soon as the operation is complete. When there are LUNs (e.g., multiple dies) connected to the same ready/busy pin (as shown in FIG. 2), which may complete operation at the same time, there may be a need to indicate which LUN is sending the status bits, and a need to avoid more than one LUN driving the ready/busy pin at the same time.

3.1 Identification by Timeslot

One method for multiple LUNs sending on the same ready/busy pin, may be to use timeslots for each LUN to send status in a known sequence of LUNs. For example, the time slots sequence could be LUN 0, LUN 1, . . . LUNn−1, when there are 'n' LUNs on the ready/busy pin. The controller 120 can initially configure (e.g., initialize) each LUN on the ready/busy pin with the LUN's time-slot number and/or time-slot duration. Then, the controller 120 may send a broadcast command (e.g., 'time-slot sequence start') to all the LUNs which indicates the start of the first timeslot to start the sequence of time slots. The broadcast command (e.g., 'time-slot sequence start') may be sent periodically if required to re-sync all the LUNs.

When a LUN's timeslot starts, that LUN may begin sending its status bits. When a LUN completes its operation, its status may change and/or may be sent when the LUN gets its next timeslot. The LUN can keep sending its current status (e.g., Busy, Ready and Success, Error) repeatedly in each of its timeslots.

Since an operation on a NAND may take 10s of microseconds to milliseconds, this may lead to a lot of repeated transmission of the same information. To avoid repeated transmission, in some embodiments, a LUN can send status in its timeslot only when there is a change in status from its previous timeslot. When there is no change from its previous timeslot, then the LUN does not transmit and/or the timeslot is idle. Since the controller 120 is sending the commands to start an operation on a LUN, the controller 120 knows the LUN will transition from the Ready state to the Busy state. Therefore, this transition from the Ready state to the Busy state does not have to be reported to the controller 120 (but it could be), and only the status change from the Busy state to the Ready state needs to be reported to the controller 120.

The bits, in some embodiments, may be sent on the ready/busy pin using any of the known methods such as, Return-to-Zero, and can optionally have parity bits to detect/correct errors.

3.2 Identification by LUN Number

Instead of having fixed time slot for a LUN and waiting for its time slot, a LUN can transmit when it has a status change from the Busy state to the Ready state. Here, the LUN may first send its unique (e.g., dedicated, respective, etc.) reporting LUN number and then the status, so that the controller 120 can know which LUN the status is for. Typically, there are only a few LUNs (4 or 8) on a NAND bus and the probability of multiple LUNs finishing operation at the same time is very low.

In some embodiments, to handle the case when multiple LUNs try to send status at the same time, the LUNs can use some existing method of collision detection and avoidance, such as Carrier-Sense Multiple Access with collision detection (CSMA/CD).

4. Methods for Implementing the Exemplary Embodiments

FIG. 3 is a flow diagram depicting a method for NAND multi-plane and multi-die status signaling, in accordance with some embodiments of the present disclosure. Additional, fewer, or different operations may be performed in the method depending on the particular embodiment. In some embodiments, some or all operations of method 300 may be performed by an SSD (or one or more components of the SSD), such as SSD 102 in FIG. 1. Each operation may be re-ordered, added, removed, or repeated.

As shown, the method 300 includes, in some embodiments, the operation 302 of performing, by a first LUN of a plurality of logical units (LUNs), a first set of one or more operations. In some embodiments, a non-volatile memory includes the plurality of LUNs. In some embodiments, each of the plurality of LUNs include a status terminal coupled to a common status terminal of the non-volatile memory and a data bus coupled to a common data bus of the non-volatile memory. The method 300 includes, in some embodiments, the operation 304 of performing, by a second LUN of the plurality of LUNs, a second set of one or more operations. the method 300 includes, in some embodiments, the operation 306 of completing, by the first LUN of the plurality of LUNs, the first set of one or more operations. In the event that only a first LUN is performing a first set of operations at one time, operation 304 may be omitted. In some embodiments, there may be further LUNs of the plurality of LUNs, in addition to the first LUN and the second LUN, each performing their own set of operations. In this case the operation 304 may be repeated for each of the further LUNs of the plurality of LUNs. The method 300 includes, in some embodiments, the operation 308 of sending, by the first LUN via the common terminal, a pulse to a controller (e.g., controller 120 in FIG. 1) responsive to completing the first set of one or more operations.

FIG. 4A is a flow diagram depicting a method for NAND multi-plane and multi-die status signaling, in accordance with some embodiments of the present disclosure. Additional, fewer, or different operations may be performed in the method depending on the particular embodiment. In some embodiments, some or all operations of method 400A may be performed by an SSD (or one or more components of the SSD), such as SSD 102 in FIG. 1. Each operation may be re-ordered, added, removed, or repeated.

As shown, the method 400A includes, in some embodiments, the operation 402A of performing, by a first LUN of a plurality of logical units (LUNs), a first set of one or more operations. In some embodiments, a non-volatile memory includes the LUNs. In some embodiments, each of the plurality of LUNs include a status terminal coupled to a common status terminal of the non-volatile memory and a data bus coupled to a common data bus of the non-volatile memory. The method 400A includes, in some embodiments, the operation 406A of completing, by the first LUN of the plurality of LUNs, the first set of one or more operations. The method 400A includes, in some embodiments, the operation 408A of sending, autonomously by the first LUN via the common status terminal, a status message indicating a status of the first LUN responsive to completing the first set of one or more operations.

FIG. 4B is a flow diagram depicting a method for NAND multi-plane and multi-die status signaling, in accordance with some embodiments of the present disclosure. Additional, fewer, or different operations may be performed in the method depending on the particular embodiment. In some embodiments, some or all operations of method 400B may be performed by an SSD (or one or more components of the SSD), such as SSD 102 in FIG. 1. Each operation may be re-ordered, added, removed, or repeated.

As shown, the method 400B includes, in some embodiments, the operation 402B of performing, by a first LUN of a plurality of logical units (LUNs), a first set of one or more operations. In some embodiments, a non-volatile memory includes the LUNs. In some embodiments, each of the plurality of LUNs include a status terminal coupled to a common status terminal of the non-volatile memory and a data bus coupled to a common data bus of the non-volatile memory. The method 400B includes, in some embodiments, the operation 404B of performing, by a second LUN of the plurality of LUNs, a second set of one or more operations. The method 400B includes, in some embodiments, the operation 406B of completing, by the first LUN of the plurality of LUNs, the first set of one or more operations. The method 400B includes, in some embodiments, the operation 408B of sending, by the controller, a multi-LUN status command to the plurality of LUNs to cause each LUN to send a status message to the controller. The method 400B includes, in some embodiments, the operation 410B of sending, by the first LUN in response to the multi-LUN status command, via the common status terminal, a status message indicating a status of the first LUN responsive to completing the first set of one or more operations. The method 400B includes, in some embodiments, the operation 412B of sending by the second LUN in response to the multi-LUN status command via the common status terminal, a status message indicating a status of the second LUN responsive to continuing to process (e.g., not completing) the second set of one or more operations.

FIG. 5A is a flow diagram depicting a method for NAND multi-plane and multi-die status signaling, in accordance with some embodiments of the present disclosure. Additional, fewer, or different operations may be performed in the method depending on the particular embodiment. In some embodiments, some or all operations of method 500A may be performed by an SSD (or one or more components of the SSD), such as SSD 102 in FIG. 1. For example, some or all operations of method 500A may be performed by a controller of the SSD, such as controller 120 in FIG. 1. Each operation may be re-ordered, added, removed, or repeated.

As shown, the method 500A includes, in some embodiments, the operation 502A of monitoring, by a controller, a common status terminal of a non-volatile memory, wherein the non-volatile memory comprises a plurality of logical units (LUNs) each having a status terminal coupled to the common status terminal of the non-volatile memory. The method 500A includes, in some embodiments, the operation 504A of detecting, by the controller, a pulse on the common status terminal that is indicative of a LUN of the plurality of LUNs completing an operation. The method 500A includes, in some embodiments, the operation 506A of sending, by the controller, a status command to the plurality of LUNs to cause each LUN to send a status message to the controller.

Figure 5B:
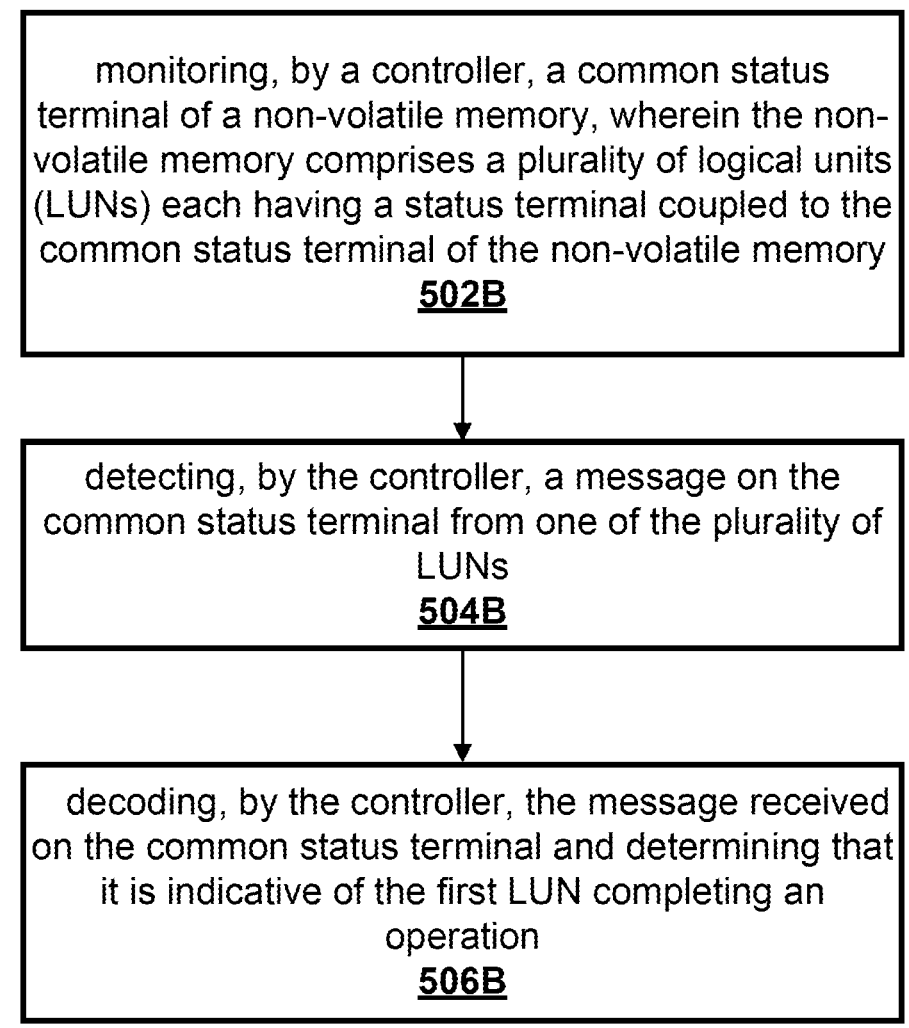
FIG. 5B is a flow diagram depicting a method for NAND multi-plane and multi-die status signaling, in accordance with some embodiments of the present disclosure.

FIG. 5B is a flow diagram depicting a method for NAND multi-plane and multi-die status signaling, in accordance with some embodiments of the present disclosure. Additional, fewer, or different operations may be performed in the method depending on the particular embodiment. In some embodiments, some or all operations of method 500B may be performed by an SSD (or one or more components of the SSD), such as SSD 102 in FIG. 1. For example, some or all operations of method 500B may be performed by a controller of the SSD, such as controller 120 in FIG. 1. Each operation may be re-ordered, added, removed, or repeated.

As shown, the method 500B includes, in some embodiments, the operation 502B of monitoring, by a controller, a common status terminal of a non-volatile memory, wherein the non-volatile memory comprises a plurality of logical units (LUNs) each having a status terminal coupled to the common status terminal of the non-volatile memory. The method 500B includes, in some embodiments, the operation 504B of detecting, by the controller, a message on the common status terminal from one of the plurality of LUNs. The method 500B includes, in some embodiments, the operation 506B of decoding, by the controller, the message received on the common status terminal and determining that it is indicative of the first LUN completing an operation.

FIG. 5C is a flow diagram depicting a method for NAND multi-plane and multi-die status signaling, in accordance with some embodiments of the present disclosure. Additional, fewer, or different operations may be performed in the method depending on the particular embodiment. In some embodiments, some or all operations of method 500C may be performed by an SSD (or one or more components of the SSD), such as SSD 102 in FIG. 1. Each operation may be re-ordered, added, removed, or repeated.

As shown, the method 500C includes, in some embodiments, the operation 502C of sending, by a controller to a first logical unit (LUN) of a plurality of LUNs, a first set of one or more operations that cause the first LUN to perform the first set of one or more operations. In some embodiments, a non-volatile memory includes the plurality of LUNs. In some embodiments, each of the plurality of LUNs include a status terminal coupled to a common status terminal of the non-volatile memory and a data bus coupled to a common data bus of the non-volatile memory. The method 500C includes, in some embodiments, the operation 504C of sending, by a controller to a second LUN of the plurality of LUNs, a second set of one or more operations that cause the second LUN to perform the second set of one or more operations. The method 500C includes, in some embodiments, the operation 506C of receiving, by the controller from the first LUN via the common terminal, a pulse responsive to the first LUN completing the first set of one or more operations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for status signaling in a non-volatile memory comprising a plurality of logical units (LUNs), each of the plurality of LUNs having both a status terminal coupled to a common status terminal of the non-volatile memory and a data bus coupled to a common data bus of the non-volatile memory, the method comprising:
   performing, by a first LUN of the plurality of LUNs, a first set of one or more operations;
   completing, by the first LUN of the plurality of LUNs, the first set of one or more operations; and
   sending, autonomously and without command from a controller, by the first LUN via the common terminal, a pulse to the controller responsive to completing the first set of one or more operations.

2. The method of claim 1, further comprising:
   performing, by a second LUN of the plurality of LUNs, a second set of one or more operations.

3. The method of claim 2, wherein the second LUN is busy performing the second set of one or more operations when the first LUN is sending the pulse.

4. The method of claim 1, wherein the first LUN comprises a plurality of planes and further comprising:
   sending, by the first LUN via the common terminal, the pulse responsive to a first plane of the plurality of planes completing the first set of one or more operations.

5. The method of claim 1, further comprising:
   prior to the first LUN sending the pulse:
      receiving, by each LUN of the plurality of LUNs via the common data bus, a message from the controller; and
      entering, by each LUN of the plurality of LUNs responsive to receiving the message, a status signaling mode from a legacy signaling mode,
      wherein the legacy signaling mode causes the plurality of LUNs to generate a combined signal at the common status terminal that indicates a busy status while a LUN of the plurality of LUNs is not busy.

6. The method of claim 1, wherein the sending of the pulse to the controller causes the controller to send a status request via the common data bus and further comprising:
   receiving, by the plurality of LUNs via the common data bus, the status request;
   sending, by the first LUN via the common data bus and according to a predetermined order, a first status message indicating a status of the first LUN responsive to the first LUN receiving the status request; and
   sending, by the second LUN via the common data bus and according to the predetermined order, a second status message indicating a status of the second LUN responsive to the second LUN receiving the status request,
   wherein the predetermined order is based on a first LUN reporting number associated with the first LUN and a second LUN reporting number associated with the second LUN.

7. The method of claim 6, wherein the second LUN sends the second status message after the first LUN sends the first status message and further comprising:
   receiving, by the plurality of LUNs from the controller via the common data bus, a message indicating one or more status message formats, wherein the second LUN sends the second status message according to the one or more status message formats to prevent an overlap of the first status message with the second status message.

8. The method of claim 7, wherein the one or more status message formats include at least one of a duration of a status message or a time offset for sending a status message after a LUN receives the status request from the controller.

9. The method of claim 7, wherein the first LUN and the second LUN are associated with a first chip enable, wherein a third LUN of the plurality of LUNs is associated with a second chip enable, and further comprising:
sending, by the third LUN via the common data bus and according to the predetermined order, a third status message indicating a status of the third LUN responsive to the third LUN receiving the status request,
wherein the third LUN sends the third status message according to the one or more status message formats to prevent an overlap of status messages associated with the first chip enable and status messages associated with the second chip enable.

10. The method of claim 1, wherein the sending of the pulse to the controller causes the controller to send a status request via the common data bus and further comprising:
receiving, by the plurality of LUNs via the common data bus, the status request, wherein the status request includes a plurality of LUN reporting numbers that correspond to a subset of the plurality of LUNs; and
sending, by each LUN of the subset via the common data bus and according to a predetermined order, a status message indicating a status of the respective LUN of the subset responsive to the respective LUN of the subset receiving the status request,
wherein the predetermined order is based on the plurality of LUN reporting numbers.

11. The method of claim 10, further comprising:
generating, by each LUN of the plurality of LUNs, a respective LUN reporting number of the plurality of LUN reporting numbers; and
sending, by each LUN of the plurality of LUNs to the controller via the common data bus, the respective LUN reporting number of the plurality of LUN reporting numbers.

12. The method of claim 1, wherein the sending of the pulse to the controller causes the controller to send a status request via the common data bus and further comprising:
receiving, by the plurality of LUNs via the common data bus, the status request, wherein the common data bus includes a plurality of pins;
sending, by each LUN of the plurality of LUNs via a respective pin of the common data bus, a respective status message of a plurality of status messages indicating a status of the respective LUN responsive to the respective LUN receiving the status request.

13. The method of claim 12, wherein at least one of:
a first subset of the plurality of LUNs send a first subset of the plurality of status messages in parallel and during a first timeslot, or
a second subset of the plurality of LUNs send a second subset of the plurality of status messages in parallel and during a second timeslot.

14. A Solid-State Drive (SSD), comprising:
a non-volatile memory comprising a first logical unit (LUN) having both a status terminal coupled to a common status terminal of the non-volatile memory and a data bus coupled to a common data bus of the non-volatile memory; and
a controller,
wherein the first LUN is configured to:
perform a first set of one or more operations;
complete the first set of one or more operations; and
send, via the common terminal, a pulse autonomously, and without command from the controller, to the controller responsive to completing the first set of one or more operations.

15. The SSD of claim 14, wherein the non-volatile memory further comprises a second LUN having a status terminal coupled to a common status terminal of the non-volatile memory and a data bus coupled to a common data bus of the non-volatile memory, wherein the second LUN is configured to:
perform a second set of one or more operations.

16. The SSD of claim 15, wherein the second LUN is busy performing the second set of one or more operations when the first LUN sends the pulse.

17. The SSD of claim 14, wherein the first LUN comprises a plurality of planes and the first LUN is further configured to:
send, via the common terminal, the pulse responsive to a first plane of the plurality of planes completing the first set of one or more operations.

18. The SSD of claim 14, wherein the controller is further configured to:
receive the pulse; and
broadcast, via the common data bus responsive to receiving the pulse, a status request to the first LUN and the second LUN.

19. A method for status signaling in a non-volatile memory comprising a plurality of logical units (LUNs), each of the plurality of LUNs having both a status terminal coupled to a common status terminal of the non-volatile memory and a data bus coupled to a common data bus of the non-volatile memory, the method comprising:
performing, by a first LUN of the plurality of LUNs, a first set of one or more operations;
performing, by a second LUN of the plurality of LUNs, a second set of one or more operations;
completing, by the first LUN of the plurality of LUNs, the first set of one or more operations; and
sending autonomously, and without command from a controller, by the first LUN to the controller via the common status terminal, a status message indicating a status of the first LUN responsive to completing the first set of one or more operations.

20. The method of claim 19, further comprising:
completing, by the second LUN of the plurality of LUNs, the second set of one or more operations;
sending, by the first LUN via the common status terminal according to a predetermined order, the status message indicating the status of the first LUN responsive to completing the first set of one or more operations; and
sending, by the second LUN via the common status terminal according to the predetermined order, a second status message indicating a status of the second LUN responsive to completing the second set of one or more operations,
wherein the predetermined order is based on a first timeslot associated with the first LUN and a second timeslot associated with the second LUN.

21. The method of claim 19, further comprising:
sending, by the first LUN via the common status terminal and prior to the first LUN sending the status message indicating the status of the first LUN, a LUN reporting number associated with the first LUN.

22. The method of claim 19, further comprising:
- preventing, by the first LUN, a collision of the status message with other status messages sent on the common status terminal by other LUNs of the plurality of LUNs.

23. A method for status signaling in a non-volatile memory, the method comprising:
- monitoring, by a controller, a common status terminal of a non-volatile memory, wherein the non-volatile memory comprises a plurality of logical units (LUNs) each having both a status terminal coupled to the common status terminal of the non-volatile memory and a data bus coupled to a common data bus of the non-volatile memory;
- detecting, by the controller, a pulse on the common status terminal autonomously sent by one of the plurality of LUNs without command from the controller that is indicative of the one LUN of the plurality of LUNs completing an operation; and
- sending, by the controller, a status command to the plurality of LUNs to cause each LUN to send a status message to the controller.

* * * * *